(12) United States Patent
Tyroler et al.

(10) Patent No.: US 7,113,099 B2
(45) Date of Patent: Sep. 26, 2006

(54) TRACKING, PRESENCE VERIFICATION AND LOCATING FEATURES AS PART OF A SECURITY SYSTEM

(75) Inventors: Dan Tyroler, Great Neck, NY (US); Alfred M. Lizza, Oyster Bay, NY (US)

(73) Assignee: Honeywell Internationakl, Inc., Morristown, NJ (US)

( * ) Notice: Subject to any disclaimer, the term of this patent is extended or adjusted under 35 U.S.C. 154(b) by 6 days.

(21) Appl. No.: 10/740,345

(22) Filed: Dec. 18, 2003

(65) Prior Publication Data
US 2005/0099299 A1    May 12, 2005

Related U.S. Application Data

(63) Continuation-in-part of application No. 10/702,290, filed on Nov. 6, 2003.

(51) Int. Cl.
*G08B 23/00* (2006.01)

(52) U.S. Cl. ............... 340/573.4; 340/825.49; 340/572.1

(58) Field of Classification Search ............... 340/505, 340/541, 572.1, 573.1, 573.4, 539.1–539.23, 340/825.49
See application file for complete search history.

(56) References Cited

U.S. PATENT DOCUMENTS

| | | | | |
|---|---|---|---|---|
| 5,030,941 A | * | 7/1991 | Lizzi et al. | 340/572.1 |
| 5,317,309 A | * | 5/1994 | Vercellotti et al. | 340/10.5 |
| 5,638,050 A | | 6/1997 | Sacca et al. | |
| 5,689,238 A | * | 11/1997 | Cannon et al. | 340/572.1 |
| 5,786,764 A | * | 7/1998 | Engellenner | 340/572.4 |
| 6,127,931 A | * | 10/2000 | Mohr | 340/573.4 |
| 6,133,832 A | | 10/2000 | Winder et al. | |
| 6,297,737 B1 | | 10/2001 | Irvin | |
| 6,307,473 B1 | * | 10/2001 | Zampini et al. | 340/572.1 |
| 6,369,710 B1 | * | 4/2002 | Poticny et al. | 340/572.1 |
| 6,512,478 B1 | * | 1/2003 | Chien | 342/357.09 |
| 6,535,120 B1 | | 3/2003 | Sebanc et al. | |
| 6,573,832 B1 | | 6/2003 | Fugere-Ramirez | |

(Continued)

FOREIGN PATENT DOCUMENTS

GB    2382959 A    * 11/2003

OTHER PUBLICATIONS

"New Smart Find™ Remote Control Key Locator", http:/www.gadgetrealm.com/k/Key_Chains/NEW_Smart_Find_Remote_Control_Key_Locator_360792.htm, 2 pp., printed Jul. 31, 2003.

(Continued)

*Primary Examiner*—Jeffery Hofsass
*Assistant Examiner*—Anne V. Lai
(74) *Attorney, Agent, or Firm*—Scully, Scott, Murphy & Presser, P.C.

(57) ABSTRACT

Tracking, presence verification, and locating features are incorporated into a security system that includes a user interface device with a display, keypad and associated transceiver. Wireless RF electronic tags are attached to different objects, e.g., an inanimate object, or a living being such as a child or pet. To verify the presence of an object associated with a tag, the user instructs the user interface device to transmit a wireless signal to the tag. The tag responds, when within range, by returning a wireless signal. In another aspect, a person is detected such as at the entry to a home, and a low-power transmitter at the entry sends a signal to the electronic tag. The electronic tag responds by transmitting data to the security system to cause it to take a desired action. The presence of a person, such as a child, in an unauthorized area can trigger an alarm.

27 Claims, 6 Drawing Sheets

U.S. PATENT DOCUMENTS

| | | | |
|---|---|---|---|
| 6,720,922 B1 * | 4/2004 | Williams et al. | 342/465 |
| 6,774,782 B1 * | 8/2004 | Runyon et al. | 340/539.13 |
| 6,788,199 B1 * | 9/2004 | Crabtree et al. | 340/568.1 |
| 6,825,763 B1 * | 11/2004 | Ulrich et al. | 340/539.1 |
| 6,882,274 B1 * | 4/2005 | Richardson et al. | 340/539.13 |
| 2001/0049629 A1 | 12/2001 | Freeman | |
| 2002/0126010 A1 * | 9/2002 | Trimble et al. | 340/568.1 |
| 2003/0030568 A1 * | 2/2003 | Lastinger et al. | 340/825.49 |
| 2003/0076225 A1 * | 4/2003 | Sebanc et al. | 340/505 |
| 2003/0197612 A1 * | 10/2003 | Tanaka et al. | 340/572.1 |
| 2004/0174264 A1 * | 9/2004 | Reisman et al. | 340/573.4 |
| 2004/0212500 A1 * | 10/2004 | Stilp | 340/541 |

OTHER PUBLICATIONS

"Key Ringer", http://keyringer.com/, 6 pp., printed Jul. 31, 2003.
Data sheet for "Now You Can Find It", www.sharperimage.com, 12 pp., printed Nov. 15, 2004.

* cited by examiner

TRACKING, PRESENCE VERIFICATION AND LOCATING FEATURES AS PART OF A SECURITY SYSTEM

CROSS-REFERENCE TO RELATED APPLICATIONS

This application is a continuation-in-part of U.S. patent application Ser. No. 10/702,290, to Dan Tyroler, filed Nov. 6, 2003, entitled "Object Locator Feature As Part Of A Security System," and incorporated herein by reference.

BACKGROUND OF THE INVENTION

1. Field of the Invention

The invention relates generally to a method and system for using a security system to locate, track and verify the presence of objects such as small objects that are misplaced in a household, or living beings such as children or pets.

2. Description of Related Art

Oftentimes objects such as car keys, glasses, remote television controls and the like are misplaced in the home. The result is frustration and lost time for the person who must conduct a search to locate the object. Various wireless devices have been developed to assist people in locating lost objects in their homes. However, these devices are relatively simplistic and have various limitations. For example, one device provides a key chain that sounds off when the user whistles or claps. Another device uses a transmitter on a key chain to locate a receiver on a second key chain. However, this assumes that both key chains have not been misplaced. Moreover, the transmitter and receiver must be used as a matched pair. Other approaches for tracking inventory or vehicles are more sophisticated but require a complete "clean sheet" system to be developed at great cost.

Furthermore, it would be desirable to provide a capability to track, locate and verify the presence of living beings such as pets, children and adults around the home.

BRIEF SUMMARY OF THE INVENTION

To overcome these and other deficiencies in the prior art, the present invention provides tracking, presence verification, and locating features that can be integrated into an existing building security system, such as in a home or business. The invention provides an end user with extra peace of mind and the assurance that his/her valuable items or living beings (family members/pets . . . ) are on the premises, within the defined boundaries (trackable) and can be located. In addition, the invention automates some security functions and makes them more user-friendly.

The invention takes advantage of some of the features and technology that already exist and are an integral part of a security system and/or its peripherals, while also using some additional components and software changes. The main components to be used are the security system display, keypad, control, RF transmitter/receiver and, in addition, small RF receiver/transmitter buttons ("electronic tags") and, in some embodiments, some dedicated transmitter devices. The solution provided is relatively inexpensive since most of the hardware elements already exist as part of a conventional security system.

In particular, adding an RF transmission capability to the electronic tag/button (in addition to the RF receiving capability) allows us to incorporate tracking and presence verification features to the security system.

To configure the system, the end user enrolls the tags' id codes into the security system memory (or keypad's memory) and assigns the desired configuration for each tag. The configuration relates to the different parameters (automatic monitoring schedules, boundaries/ranges, location, conditions and action to take, etc . . . ) the end user would like to monitor for the "carrier" (item/living being) associated with a corresponding electronic tag. The entire addition/deletion of electronic tags and the configuration setup can be done via the security system keypad with custom designed menu selections displayed.

At this stage the complete monitoring features become part of the security system. At any time, the end user can select from the security system memory, the appropriate object he would like to monitor and confirm its presence, location, etc. Furthermore, the security system can perform automatic/scheduled monitoring, based on the configuration preprogrammed by the end user for each of the electronic tags. In any case, based on a user command, or an automatically scheduled event, the appropriate id code, unique to each electronic tag, is transmitted by the security system RF transmitter. Upon receiving its id code signal, the appropriate electronic tag could make a local noise on a built in sounder element (piezo or such), and reveal its location. The electronic tag could also respond back with its id code to confirm its presence or cause an action to be taken by the security system (actions such as sound/announcements/dial report to central station/turn on siren/beeps, etc.), depending on the type of signal sent by the electronic tag, or the lack of a signal from the electronic tag, and the configured condition/behavior of the security system.

In one aspect of the invention, an apparatus with a presence verification feature includes a user interface device for receiving a command from a user to verify the presence of an object; a transmitter; a control responsive to the command for controlling the transmitter to transmit a wireless signal encoded with an identifier of an electronic tag associated with the object; and a receiver for receiving a wireless signal from the electronic tag that is responsive to the wireless signal transmitted thereto. The control is responsive to the wireless signal received by the receiver for informing the user, via the user interface device, that the presence of the object is verified.

In another aspect of the invention, an electronic tag for use with a presence verification feature includes a memory for storing an identifier; a receiver for receiving a wireless signal encoded with an identifier; a control for comparing the stored identifier to the received identifier; and a transmitter responsive to the control for transmitting a wireless signal for verifyng a presence of the electronic tag when the stored identifier matches the received identifier.

In another aspect of the invention, a detection apparatus includes a detector at a specified location for detecting the presence of a living being within a specified range; a transmitter at the specified location; and a control responsive to the detector for controlling the transmitter to transmit a wireless signal with a specified energy based on the specified range. The wireless signal from the transmitter, when received by an electronic tag within the specified range, causes the electronic tag to transmit a wireless signal with data to a security system.

In another aspect of the invention, an electronic tag includes a memory for storing an identifier; a receiver for receiving a first wireless signal; a transmitter for transmitting a second wireless signal; and a control responsive to receipt of the first wireless signal by the receiver for controlling the transmitter to transmit the second wireless signal to a security system. The second wireless signal is encoded with the identifier and other data for use by the security system.

In another aspect of the invention, a method for controlling a security system includes detecting the presence of a living being within a specified range of a detector at a specified location; responsive to the detecting, controlling a transmitter at the specified location to transmit a wireless signal having a specified energy based on the specified range; receiving the wireless signal at an electronic tag when the electronic tag is within the specified range; and responsive to the receiving, transmitting a wireless signal, which includes data for use by the security system, from the electronic tag to the security system.

In another aspect of the invention, a security system apparatus includes a receiver for receiving a wireless signal encoded with data from an electronic tag; a memory programmed with instructions for performing a specified action; and a control for accessing the memory to carry out the instructions for performing the specified action responsive to the data received in the wireless signal.

In another aspect of the invention, a security system apparatus includes means for receiving a user setting for configuring a transmission range of a remote transmitter; and a control responsive to the means for receiving for controlling a local transmitter to transmit a signal to the remote transmitter to configure the transmission range thereof according to the user setting.

In another aspect of the invention, a security system apparatus includes means for receiving a user setting for configuring a transmission range of a local transmitter; and a control responsive to the means for receiving for controlling the local transmitter to configure the transmission range according to the user setting.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

The invention provides an object locator feature that can be integrating into an existing security system, such as in a home or small business.

Figure 1:
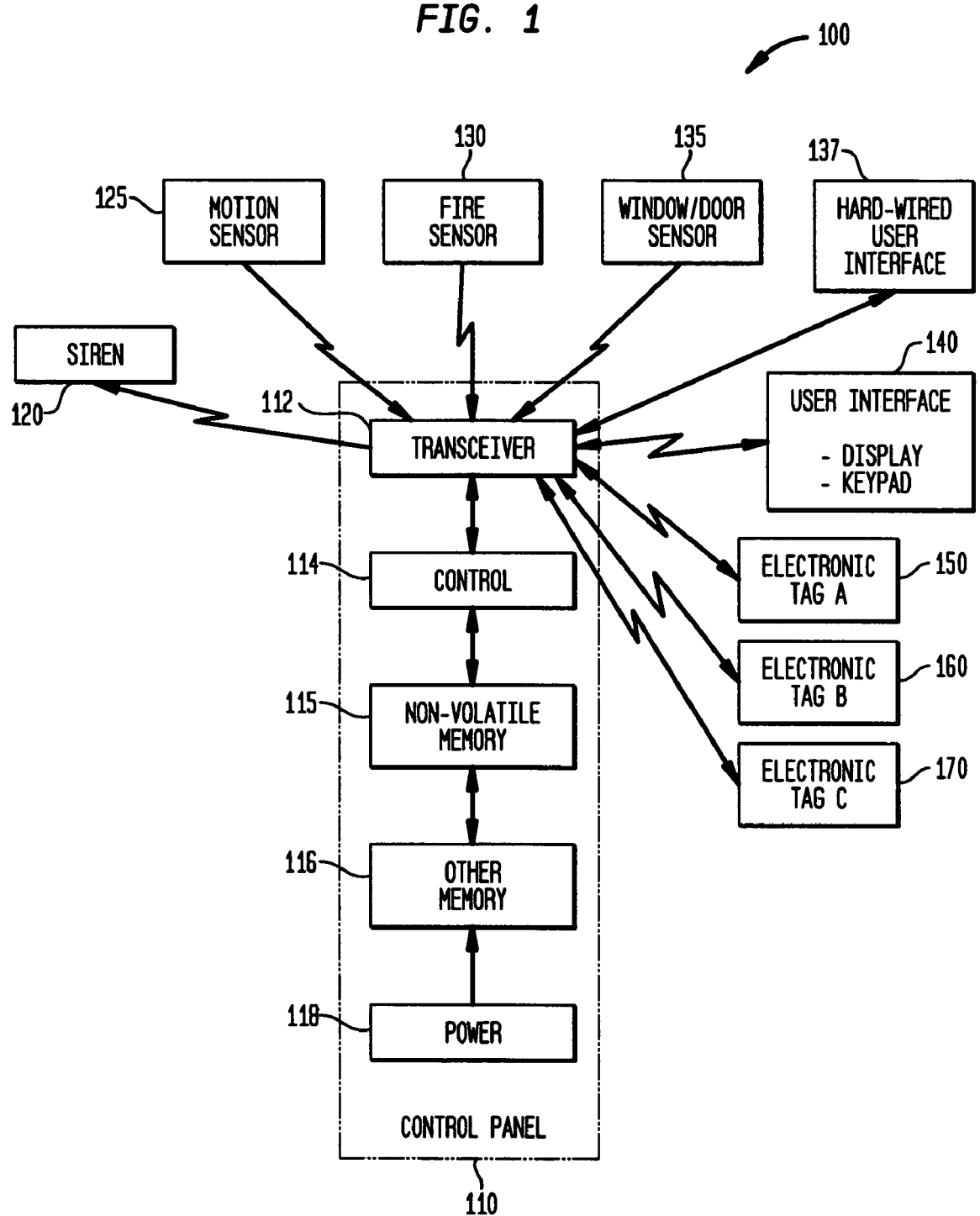
FIG. 1 illustrates an overview of an example security system with tracking, presence verification, and locating features, according to the invention.

FIG. 1 illustrates an overview of an example security system with tracking, presence verification, and locating features, according to the invention. Many homes and small businesses today are equipped with security systems to deter burglaries and detect fires or other hazards such as carbon monoxide. A security system 100 includes a central control panel 110 that communicates with a number of sensors via a wired or wireless path. For example, the control panel 110 may receive signals from motion sensors 125 that detect when a person enters a room. Signals received from fire sensors 130, such as smoke or heat sensors, indicate that a fire has been detected. Signals received from window and door sensors 135 indicate that a window or door has been opened.

Signals received from a peripheral user interface device 140, e.g., including a keypad and display, may arm and disarm the system, as well as trip an alarm via a panic button feature. The user interface device 140 may be the primary interface between the human user and the security system 100. The user interface device 140 typically includes components that are analogous to the control panel 110, including a control, memory and power source. Optionally, the user interface device 140 includes a transceiver. The user interface device 140 is commonly provided as a wireless device to allow it to be permanently installed in the home without running wire, such as by affixing it to a wall. Or, the user interface device 140 may be a portable unit that can be placed on a table, for instance. Moreover, multiple user interface devices may be provided in a home, such as in different rooms. The control panel 110 generally is a larger component that may be installed in an unobtrusive location in the home, such as a closet or basement. However, it is not necessary for the user interface device 140 to be separate from the control panel 110, or to communicate by wireless signals with the control panel 110. For example, the user interface device 140 may be integrated into the control panel 110. Optionally or additionally, a hardwired user interface device 137 may hardwired to the control panel 110.

Various other components may communicate with the control panel 110, such as a wireless key fob that is used to trip an alarm. The control panel 110 may also transmit signals to components of the security system 100. For example, signals may be transmitted to a siren 120 to activate the siren when an alarm condition is detected. Signals may be sent to the user interface device 140 to display status information to the user, such as whether the system is armed or disarmed, or whether a specific door or window has been opened. The control panel 110 may also have the ability to notify local emergency services of an alarm condition via telephone or other means, such as long range radio, cellular telephone, etc.

To facilitate installation and avoid the need to install wiring in a home, wireless security system components may be employed. Some components only transmit or receive. For example, the motion sensors 125, fire sensors 130, and window and door sensors 135 typically only transmit back to the control panel 110 when they are tripped, while the siren 120 only receives a signal from the control panel 110 when the control panel 110 detects an alarm condition based on a signal received from one of the sensors. The user interface device 140 may have both transmit and receive capabilities to communicate with the control panel 110. The wireless security system components may use radio frequency (RF) signals. One system uses signals at 345 MHz to provide a nominal indoor range of 200 feet. Different manufacturers may use different proprietary schemes for communicating data. For example, different coding and modulation techniques may be used.

The control panel 110 may include a local transceiver (transmitter and receiver) 112 for transmitting and receiving wireless signals. Or, the transceiver 112 may be external to the control panel 110, and connected via a wired or wireless path to the control panel 110. The control 114 includes a microprocessor that may execute software, firmware, microcode or the like to implement logic to control the security system 100. The control panel 110 may include a non-volatile memory 115 and other additional memory 116 as required. A memory resource used for storing software or other instructions that are executed by the control 114 to achieve the functionality described herein may be considered a program storage device. A dedicated chip such as an ASIC may also be used. Generally, each wireless component of the security system must be "learned" by the control 114. In the learning process, data is stored in the non-volatile memory 115 that identifies the characteristics of each sensor, including the sensor type, serial number or other identifier, and what type of action to take based on signals received from each sensor. For example, the action may be to provide a status message to the user, store data for subsequent maintenance purposes, or trip an alarm. A power source 118 provides power to the control panel 110 and typically includes a battery backup to AC power.

In accordance with the invention, tracking, presence verification, and locating features feature can be incorporated into an existing security system. That is, existing wireless communication components and transmitting and receiving protocols of the control panel 110 and/or user interface device 140 can be used to achieve various features. In one embodiment, the only new components that are required are electronic tags that can be attached to objects to be located. In other embodiments, additional components such as remote transmitter and motion detectors are used. However, such components can be easily integrated into the security system. The appropriate control logic can be implemented as the control panel 110 and/or user interface device 140 are upgraded. Example electronic tags 150, 160 and 170 are shown in FIG. 1 as having a bi-directional wireless communication capability with the transceiver 112. For example, the transceiver may send a wireless signal to activate one of the electronic tags to sound off to reveal its location. An electronic tag may also have a light or vibrating mechanism to reveal its location.

The electronic tag can send a wireless signal back to the transceiver 112 in response to the received wireless activation signal to verify its presence. This can be in addition to, or in lieu of, sounding off. In one possibility, the user enters a command in the user interface device 140 requesting to verify the presence of a selected object. In another possibility, the user enters a command that selects a schedule for querying, e.g., polling, one or more specified electronic tags at specified times, e.g., every few minutes, to periodically verify their presence. For example, an electronic tag may be provided in the clothing of a child that is playing in the home or near the home, such as in the backyard. The presence of the child in these areas can be verified to inform a parent in the home that the child has not departed from these safe areas. A similar scenario may exist for pets and absent-minded senior citizens, for instance.

The verification of the presence of an electronic tag, and thus the presence of the associated object, can be communicated to the user in different ways. For example, the user interface device 140 can emit a tone or voice message when the presence has been verified. Also, the user interface device 140 can trigger an alarm if the object is not present, e.g., when the associated electronic tag does not reply to the signal from the transceiver 112. The user interface 140 can also maintain historical data regarding the presence or absence of an electronic tag.

Note that electronic tags 150, 160 and 170 could also receive wireless activation signals from a transceiver associated with the user interface device 140. The range of the wireless activation signals may be improved by using multiple transmitters. Moreover, when the user interface device 140 is portable and transmits an activation signal, the user may carry the user interface device 140 around the home to be sure that a strong signal is provided in each room, and to able to monitor a specific area if required. The user interface device 140 may include a microprocessor that executes software, firmware, micro-code or the like stored in memory, or a dedicated chip such as an ASIC, to control the security system 100. Thus, the intelligence for activating the electronic tags 150, 160 and 170 can be carried out at different locations in the security system 100, such as at the control panel 110 and at one or more peripheral user interface devices 140. For example, the user interface device 140 can send commands to the control panel 110, such as to command the transceiver 112 to transmit a signal to locate or verify the presence of an object. At the same time, the user interface device 140 can command its own local transceiver to transmit an activation signal. Or, the control panel 110 can command its transceiver 112 and a transceiver in the user interface device 140 to transmit an activation signal. When multiple user interface devices 140 are used, it may be preferably for the centralized control panel 110 to act as the primary intelligence in the system 100.

Figure 2A:
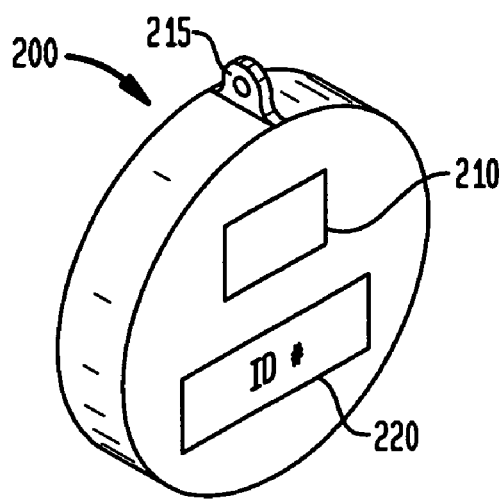
FIG. 2a illustrates an example rear perspective view of an electronic tag, according to the invention.
Figure 2B:
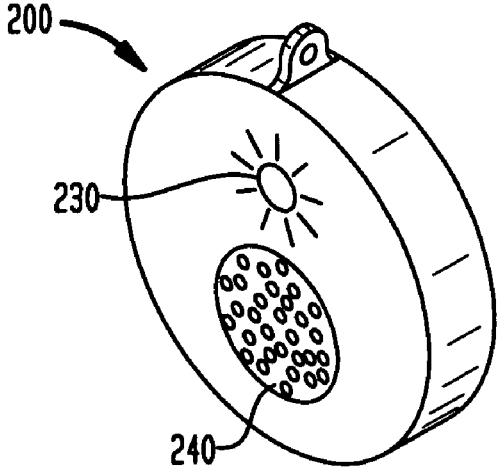
FIG. 2b illustrates an example front perspective view of an electronic tag, according to the invention.

FIG. 2*a* illustrates a rear perspective view of an electronic tag according to the invention, and FIG. 2*b* illustrates a corresponding front perspective view. Electronic tags in a variety of configurations can be provided to facilitate attachment to objects to be located. An example electronic tag 200 may be provide in a small plastic housing that can be adhered to objects using double sided tape 210, Velcro, or adhesive, for instance, or built into an inanimate object such as a hand-held remote control, eyeglass case, purse, wallet, garment, tool, cane, key chain, and the like. Generally such objects are found around a home or small business or the like. Moreover, the electronic tag can be carried by a living being such as a child or pet. For example, the electronic tag 200 can be sewn into the lining of a garment or shoe worn by a child, or worn on a necklace, watch or bracelet, or attached to the collar of a pet dog or cat. The electronic tag can be carried on a key chain or in a purse as well. Moreover, the functions of the electronic tag 200 can be incorporated into an existing peripheral device of the security system, such as a key fob that is used to arm or disarm the system. The tag is provided for any object to be tracked, located or have its presence verified.

The tag can be designed with a slim cross section to allow it to be used to locate files in an office. An aperture 215 can be used to fasten the tag 200 to an object. An identifier 220 that is readable by the user may be provided on the tag 200. The identifier 220 may include a string of characters, including numbers and/or letters, such as a serial number or other identifier, that the user uses to learn the tag and associated object into the logic of the control panel 110 and/or the user interface device 140. The identifier 220 may be provided on a sticker or molded into the tag 200, for instance. It is also possible to provide an identifier in a machine-readable form, such as in a bar code, or stored in a magnetic memory. In this case, an appropriate reader is used to recover the identifier for use by the control panel 110 and/or the user interface device 140. When the electronic tag 200 receives an activation signal that is encoded with the identifier 220 of the tag 200, the tag 200 may sound off via an audible sounder 240 to reveal its location. A light 230 or a vibrating mechanism, not shown, may also be used. Furthermore, the electronic tag 200 confirms its presence to the user interface device 140 or control panel 110 by returning a wireless signal that is received by the user interface device 140 or control panel 110. This wireless signal may be encoded with the tag's identifier, for instance.

Figure 3:
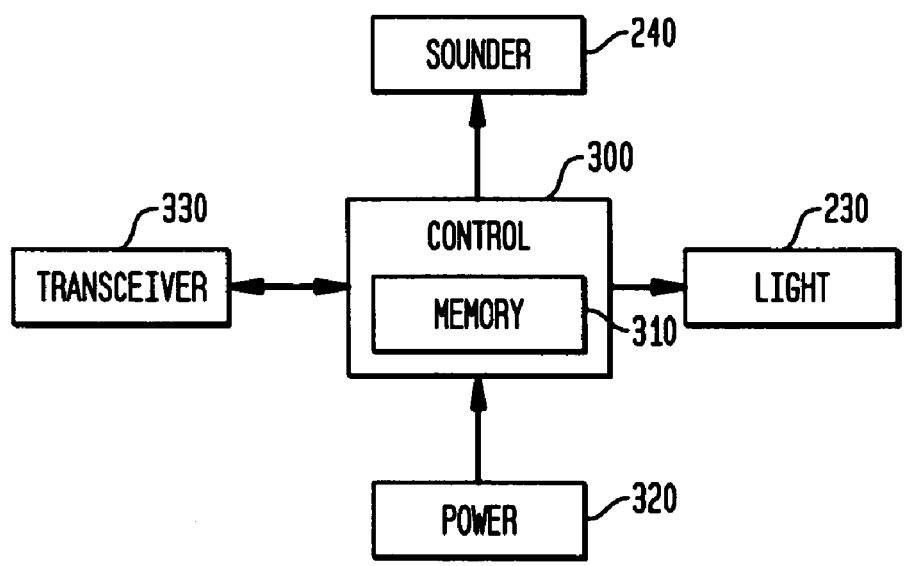
FIG. 3 illustrates an example block diagram of an electronic tag, according to the invention.

FIG. 3 illustrates a block diagram of an electronic tag according to the invention. The electronic tag can be constructed economically. Generally, the electronic tag includes a transceiver 330 for receiving and transmitting wireless encoded signals via a built-in antenna in communications with the control panel 110 or user interface device 140. A control 300 acts a decoder to decode the identifier in the received signal and determine if the identifier matches the identifier that has been assigned to the tag. For example, the memory 310 may store the identifier of the tag that was assigned at the time of the tag's manufacture, e.g., in a pre-programming. The control 300 also acts as an encoder to encode the identifier in its transmitted signal.

Furthermore, the transmitted signal of the tag may include other data such as a command or status information for controlling the security system 100, as discussed further below. In this case, data for providing the command may be stored in the memory 310. The tag 200 can be pre-programmed with the identifier and/or the data for providing the command at the time of manufacture. Or, the identifier and/or the data for providing the command can be transmitted, e.g., by the security system 100, or by the transmitter 510 of FIG. 5, and received and stored by the tag 200.

A memory resource used for storing software or other instructions that are executed by the control 300 to achieve the functionality described herein may be considered a program storage device. The identifier and/or data for providing the command for controlling the security system 100 may also be pre-programmed in an ASIC in the tag 200, or via a remote configuration from the security system 100. The control 300 may be a microprocessor or ASIC, for example. The power source 320 may be a small Lithium battery, while the sounder 240 may be a piezo sounder, and the light 230 may be a LED. The life of the power source 320 can be extended by employing logic in the control 300 that puts the tag in a sleep or standby mode and periodically wakes it up to see if a signal is present.

Figure 4A:
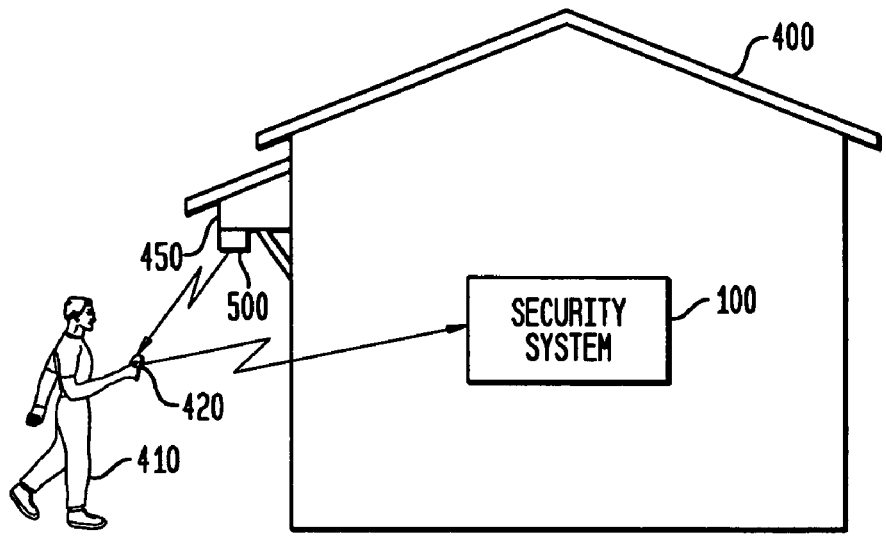
FIG. 4a illustrates a first example scenario for controlling a security system, according to the invention.

FIG. 4a illustrates a first example scenario for controlling a security system, according to the invention. Another important part of the invention is the ability of the electronic tag to receive special RF transmission signals, including commands and/or other data for use by the security system 100, from some dedicated transmitter devices that might be located at certain dedicated areas, such as a pool area or at entry/exit doors, which will instruct the electronic tag to send the appropriate unique RF signal to the security system. The security system will process the received signal and generate the appropriate actions. For example, an electronic tag 420 may receive an RF signal from a dedicated transmitter device located next to an entry door, which causes the tag 420 to send a special RF signal to the security system's control panel to instruct it to take a desired action, such as disarming the system, sounding an alarm, etc. The signal to the electronic tag which causes it to trigger a special RF signal could be generated by the dedicated source by any valid method, not necessarily by RF signal transmissions.

Figure 5:
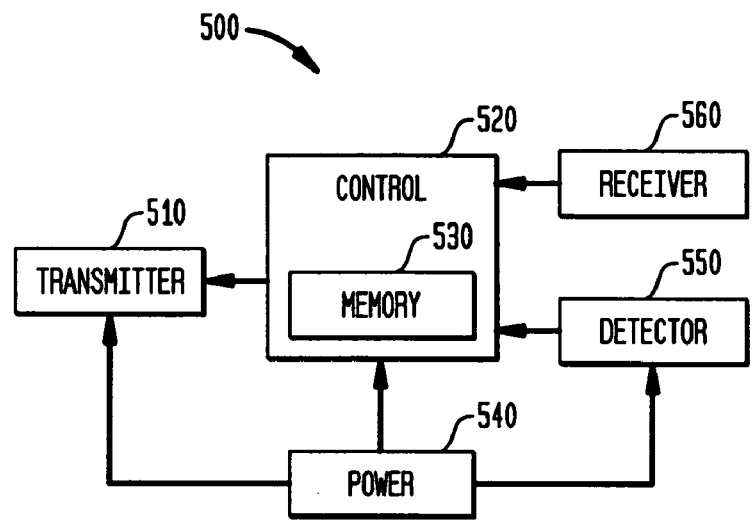
FIG. 5 illustrates an example remote transmitter/detector according to the invention.

In one possible scenario, the invention provides tracking and/or locating of a living being such as a person 410 at different locations with respect to a building 400, such as at the entry to a door of the building 400, under a porch 450, for instance. A detector/transmitter device 500 (see FIG. 5) is positioned at a desired location. FIG. 5 illustrates an example remote transmitter/detector according to the invention. The device 500 includes a detector 550, transmitter 510, control 520 with memory 530 and a power source 540. The device may also include a receiver 560 for receiving remote configuration signals from the security system 100, such as signals for setting the transmission range of the transmitter 510 and the detection range, e.g., sensitivity, of the detector 550. It is also possible to set a hardware configuration of the transmitter 510 and detector 550, e.g., at the time of manufacture or installation using switches, jumpers, DIP switches, etc. The control 520 receives a signal from the detector 550 when a living being has been detected. In response, the control controls the transmitter 510 to transmit a wireless signal to the electronic tag 420. The wireless signal may carry data or otherwise be configured so that the signal is recognized by the electronic tag. The control 520 may also decode remote configuration data received via the receiver 560. A memory resource, e.g., memory 530, used for storing software or other instructions that are executed by the control 520 to achieve the functionality described herein may be considered a program storage device. The control 520 may be a microprocessor or ASIC, for example. The power source 540 may be a small Lithium battery or AC power. The detector 550 and the transmitter 510 may be located within the same device or within separate devices.

The detector 550 can be a motion detector, e.g., infrared or microwave, for example, that detects when the person 410 is within range of the detector 550, such as a distance of a few feet. Other approaches for detecting the person may be used, such as a pressure sensitive switch under a floor mat, an infrared light beam that is interrupted by the person 410, and so forth. When the person 410 is detected, the detector 550 instructs the transmitter to transmit a wireless signal to the electronic tag. In response to receipt of this signal, the electronic tag 420 transmits a signal with appropriate data to the security system 100 for causing a desired action in the security system. The wireless signal of the transmitter 510 has a specified, generally low power so that it can be received within a selected range that may correspond to the detection range of the detector 550. The detector 550 and transmitter 510 can be configured with control, software, hardware and memory resources, and positioned as required.

Another important part of the invention is the ability to control the RF transmission/receiving levels, on either side: the security system's transmitter/receiver or the electronic tag's transmitter/receiver, thus enabling tracking of the "carrier" or living being, and determining more accurately the location of the carrier. This can be achieved in different ways, such as by pre-programming of the devices at the time of manufacture or installation, or by configuring via a software download e.g., from the security system 100, or via a dual in-line pole (DIP) switch or other hardware setting.

As a result of the gathered information from the electronic tag 420, the security system 100 can take the appropriate actions. These actions may have been pre-assigned by the end user during a configuration procedure or may include other actions that are normally performed by the security system 100 upon receiving the RF signal. The user may provide settings to configure the security system 100, such as by setting DIP switches in the user interface 140, or via keypad entries at the user interface 140, for instance. This concept could be adapted and used by other security peripheral devices which include transmitters/receivers (ex.: wireless keypad, etc.). In the case of a wireless keypad, (which has transmit/receive capability), the end user might be able to have a better "RF coverage" or monitoring in a specific area, by relocating a portable wireless keypad when searching for the misplaced item or monitoring a specific object.

The wireless signal from the transmitter 510 is received by the electronic tag 420, which is carried by the person, e.g., in a key chain, necklace, purse, etc. The person need not hold the tag 420 in his or her hand in order to receive the signal. In one possible approach, the wireless signal is encoded with data for use by the security system, such as a command or commands, status information, that is to be relayed to the security system 100 in the building 400. Or, the wireless signal from the transmitter 510 may simply trigger the electronic tag 420 to take a pre-programmed action such as transmitting specific data to the security system 100. The electronic tag 420 may receive and decode the wireless signal, then take the desired action. The electronic tag 420 then encodes and transmits its own wireless signal that carries data for causing a desired action in the security system 100. The signal may also include the tag's identifier. This signal is received and decoded by the security system 100. The data of the transmitter 430 is considered to be relayed by the electronic tag 420 to the security system 100 even if the data s re-encoded using a different coding scheme than used in the wireless signal from the transmitter 430. The tag 420 is configured to recognize the data and respond as described. The wireless signal from the transmitter 510 may include a portion, within the data for use by the security system 100, or separate from that data, that is universally recognized by different tags as an instruction to relay the data, or to communicate pre-programmed data stored locally to the security system 100, as described further below. Note that the detector 550 and transmitter 510 need not directly communicate with the security system 100.

The data in the tag's signal may include instructions for arming or disarming the security system 100, or for controlling components in the security system, for instance. Generally, the data can include any command or status information that is used by the security system. The data may include a specific instruction, such as to trigger an alarm, which the security system executes. Or, the data may include status information that the security system processes to determine a specific action to take. For example, the status may be "person A is in area X", and the action may be to trigger an alarm if that person is not authorized to be in that area.

The security system 100 may verify that the identifier is recognized before accessing its memory to carry out instructions for performing a specified action. For example, the security system 100 may compare the received identifier to a list of authorized identifiers to confirm that the received identifier is associated with an authorized person before disarming the system. The data may also identify a location of the transmitter 510, in which case the security system 100 verifies that the person associated with the received identifier is authorized to enter the building 400 via the specific location before disarming the system. For example, there may be multiple entrances to the building 400 that are configured as indicated. Access can be granted to the identifiers associated with specified persons. For instance, access may be granted to a garage but not to the main home for an identifier associated with a hired worker. Moreover, the security system 100 may be configured by the user to impose time and date restrictions on access. The movement of a person between the different locations can also be tracked by identifying the location in which the associated electronic tag is activated to communicate with the security system 100.

In another possible approach, the wireless signal from the transmitter 510 includes one or more identifiers, and the electronic tag 420 compares the received identifier to a stored identifier. The electronic tag takes a desired action only if the identifiers match. However, this approach requires the transmitter 510 to be configured with the identifiers, and for the tags to perform additional processing.

Many convenience and safety features can thus be provided. For example, in one possible scenario, the person 420 walks up to the home 400 with an electronic tag in her purse. The motion detector 550 detects the person and activates the transmitter 510 to transmit a wireless signal encoded with an instruction for disarming the security system 100. The person can thus enter the home 400 without worrying about having to disarming the security system 100. The security system may take other actions, such as turning on lights in the home when disarming the system, and sending a signal to the electronic tag 420 to cause it to beep as a confirmation to the user that the security system 100 was disarmed. Logic can be implemented by the security system 100 to distinguish between when a person exits the home and when the person returns to the home. For example, disarming may not be carried out for several minutes after an "armed away" entry by the user on the user interface device 140 since this indicates the user is exiting the home. In another possible scenario, the person 420 walks up to an automated door of the home 400 such as a garage door, and the security system causes the door to open or unlock via an appropriate link to the door.

Figure 4B:
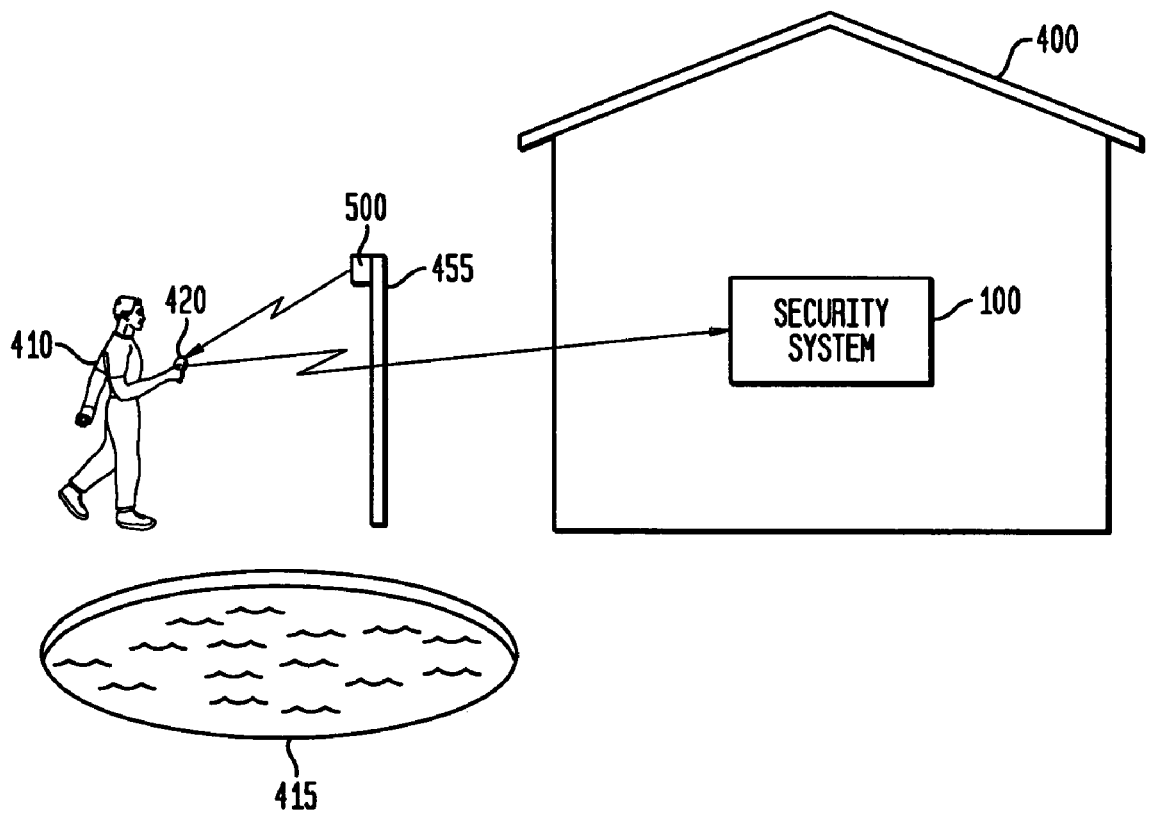
FIG. 4b illustrates a second example scenario for controlling a security system, according to the invention.

FIG. 4b illustrates a second example scenario for controlling a security system, according to the invention. In this scenario, an alarm is sounded by the security system 100 when a person 410 enters a prohibited area. For example, it may be desired to prohibit a child from entering a pool area 415. In this case, the detector 550 and transmitter 510 are located on a post 455. The detector 550 detects the person 410 in the pool area 415 and activates the transmitter 510 to send a wireless signal with a selected strength to cover a selected range corresponding to the prohibited area. The wireless signal, including data for use by the security system, is received and decoded by the electronic tag 420, which may be sewn into the child's clothes, for instance. The electronic tag 420 then transmits its own wireless signal, which includes its identifier, and relays the data for use by the security system from the transmitter 510. This signal is received and decoded by the security system 100. The security system 100 may process the identifier to determine if it is associated with a person, such as a child, that is not authorized to be in the specified location. If this is the case, an alarm may sound to inform a parent of the dangerous situation. The location of the person 410 can also be provided in the alarm, for example, in a voice alarm (e.g., "Warning—child near pool") or a display. If the identifier is associated with a person, such as an adult, who is authorized to be in the specified location, no alarm need be sounded.

Note that the identifier received by the security system 100 can be associated with a specific individual, e.g., a person in the household, or a category of individuals, e.g., child or adult. Authorizations can thus be set for each individual or category.

When the transmitter 510 provides the data for use by the security system to the tag 420, this allows for real-time or on-the-fly configuring of the tag's functionality. In another possible approach, data for use by the security system is pre-programmed into the electronic tag 420, e.g., before the time when it is used. For instance, the tag 420 may be pre-programmed at the time of manufacture with data for providing a command, such as a command that indicates the tag is in an unauthorized location. In this case, the transmitter 510 sends a wireless signal to the tag 420 to cause the tag to transmit its signal with the pre-programmed command to the security system 100. This approach provides a dedicated function for the tag 420 which may be desirable in some cases. In a further possible approach, the data for providing the tag is pre-programmed into the tag by the security system 100.

Figure 6:
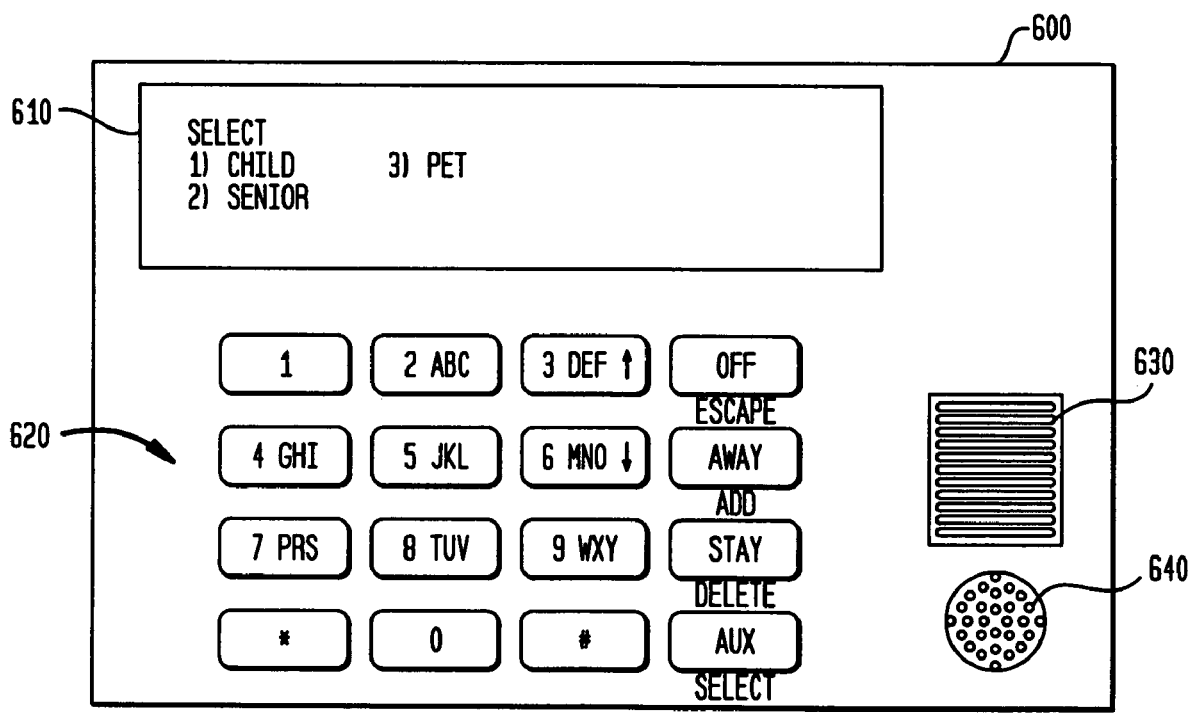
FIG. 6 illustrates an example user interface device according to the invention.

FIG. 6 illustrates a user interface device according to the invention. As mentioned, the user interface device 600 can be provided, e.g., as a peripheral to the main control panel 110, similar to the user interface device 140 in FIG. 1, or as part of the main control panel 110. The exact arrangement of components is transparent to the user since the user only interfaces with the user interface device 600. Thus, the functionality that is described herein as being provided by a user interface device may be provided wholly locally to the device 600, or partially remotely, such as at the associated control panel 110. The user interface device 600 includes a user input component such as a keypad 620 and/or microphone 640 for speech recognition in a voice-activated system, and a user output component such as a display 610 and/or speaker 630. The display 610 may be a multi-line, multi-character LCD display, for instance. The display 610 can provide a graphic device such as a cursor or other highlight to indicate which object will be selected when the "select" key is pressed. In the example shown, the display 610 indicates that the user may select from among a "child", a "senior" person, and a "pet". The respective names of the persons and pet may be displayed instead.

Advantageously, the user interface device 600 is of the type that is used for controlling a home security system so no re-design, e.g., to provide additional keys on the keypad 620, is necessary. In particular, functions can be assigned to existing keys (soft keys) to accommodate the functionality of the present invention. Each key can have more than one function as well by employing double function or soft keys. For example, the "off" key has the additional function of "escape", the "away" key has the additional function of "add", the "stay" key has the additional function of "delete", and the "aux" or "auxiliary" key has the additional function of "select". Each of the additional functions can be accessed by pressing a "shift" or "function" key or the like, or by simply entering the search mode. The "off", "away", "stay" and "aux" keys are associated with the conventional security system features, while the "add", "delete" and "select" keys are associated with the object locator feature. Note that, optionally, dedicated keys can be provided for the object locator feature.

Control logic associated with the user interface device 600 allows it to operate in an "edit" mode and a "search" mode, in addition to operating in a mode for controlling the security system. A specific key press sequence allows the user to enter each mode. In the edit mode, the user learns each electronic tag to the user interface 600 by using the keypad 620, for instance, to enter the identifiers of the electronic tags and descriptive information regarding the objects that the tags are being associated with. The user can subsequently edit the information by adding the identifiers for new tags, modifying the descriptive information that was previously entered for a tag, and deleting the information for a tag. In the search mode, the user selects a particular object to search from among the entered objects. For example, the keys in the keypad 620 having an up arrow or down arrow may be used to scroll up and down, respectively, in a list of objects, while the "select" key may be used to select a particular object. Any appropriate menu display and logic may be used. A transmitter associated with the user interface device 600 then sends a wireless signal that is encoded with the identifier of the selected object. If the selected object is within range, it responds by returning its own wireless signal to confirm its presence.

Figure 7:
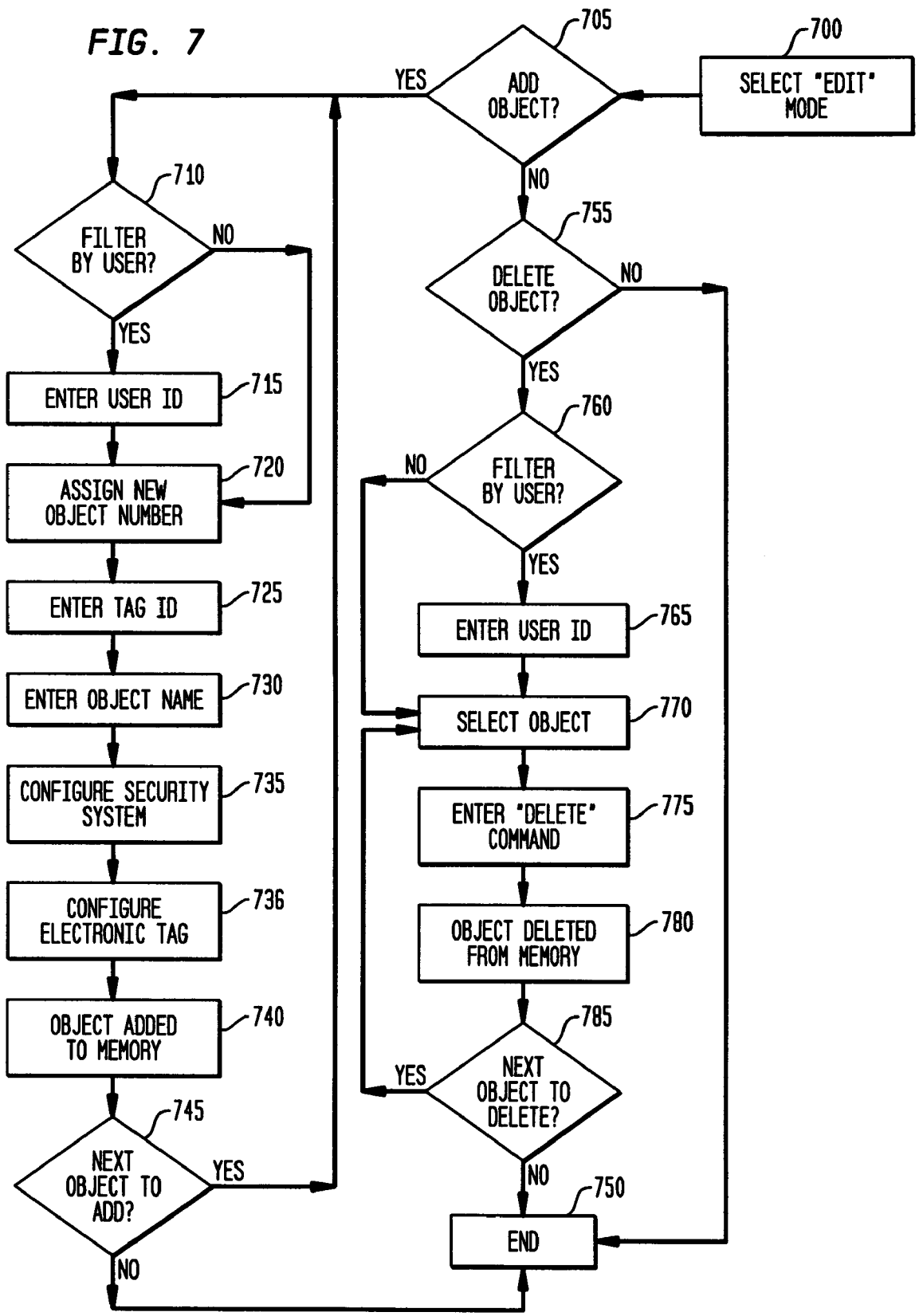
FIG. 7 illustrates an example method for editing information regarding objects to be located according to the invention.

FIG. 7 illustrates an example method for editing information regarding objects to be located according to the invention. At block 700, the user selects the edit mode on the user interface device 600, e.g., by entering an appropriate key sequence, such as "*1". The user may have previously entered a password or the like for accessing the user interface device 600. If a new object is being added (block 705), the user optionally determines whether the object should be filtered by user (block 710). This feature allows specific objects to be associated with a specific user. As an example, there may be two members of a household who each use the electronic tags to locate their glasses. Some confusion may be created if the display 610 provides two entries for "glasses". By filtering, only the glasses of the corresponding user will be displayed. Also, when a large number of objects have been learned to the user interface device 600, a subset of the objects can be displayed while in the "search" mode to enable a particular user to quickly find the objects of interest to him or her without scrolling through the entire list of objects on the display 610. If the filter feature is selected, the user enters an identifier such as their name, initials, or ID number (block 715) to associate the new object with its their identity.

At block 720, a new object number may be assigned to the object that is to be entered. For example, assuming that five objects are already learned, the new object may be assigned number six by the control logic associated with the user interface device 400. At block 725, the tag identifier is entered. The user simply reads the identifier from the tag, such as identifier 720 in FIG. 2*a*, and presses the corresponding key sequence using the keypad 620. If the identifier is in machine-readable form, an appropriate peripheral to the user interface device 600, such as a bar code reader, is used to read the identifier. At block 730, the user enters descriptive information regarding the object with which the tag is associated. This would typically be a text string, e.g., "glasses" or "pet". At block 735, the user may enter information for configuring the security system with specific behavioral characteristics relative to an object. For example, this may include setting an automatic schedule for monitoring the object, or setting the transmission and receiving configurations for the user interface 140 or control panel 110, and/or the remote transmitter 510 and detector 550. For example, the configurations of the transmitter 510 and the detector 550 may be set according to a user setting, e.g., by a remote signal from the security system control panel 110 or user interface 140, or a hardware setting, e.g., by a switch that is set by an installer or at the time of manufacture. The transmitting range can be configured by adjusting the transmitting power, and the receiving sensitivity can similarly be adjusted. Moreover, the configurations of the transceiver 112 may also be set according to a user setting, e.g., by a user input at the keypad of the user interface 140, or a hardware setting. Note that the user may desire to adjust the transmission range of the transceiver 112 to monitor the presence of a child within a specific range, such as within a room, the home, or the yard.

At block 736, the user may enter information for configuring the electronic tag associated with the object. For example, this may include configuring the data that the tag transmits, or other desired actions that the tag performs, when the tag is polled by the security system 100, or when it receives a signal from the remote transmitter 510. The data may be configured by a hardware setting or a remote user setting. The transmission and receiving configurations of the tag may also be set based on a remote user setting or a hardware setting. The tag may also be configured as belonging to a class of objects, such as children, adults or pets. However, the tag may already be configured, e.g., at the time of manufacture, in which case no further user configuration is needed. A separate menu may be used for implementing the features of blocks 735 and 736.

At block 740, the object is added to a memory associated with the user interface device 600 by storing the tag identifier and the associated descriptive information. The "add" key can be used for this purpose. This information can subsequently be retrieved to allow the user to select an object to locate or verify its presence, and to transmit a signal encoded with the corresponding identifier. The process is repeated to add additional objects at block 745, or terminated at block 750.

Also in the edit mode, the user may choose to delete objects at block 755. This may be done on a user-filtered basis at blocks 760 and 765 by allowing a user to only delete the objects that have previously been associated with the user. The user selects an object to be deleted at block 770 from a list of objects, e.g., that appear in the display 610, and enters a "delete" command (block 775) such as by pressing the "delete" key. For example, the user may press the "select" key in the keypad 620 once to select an object in the list, at which time the display 610 asks "Delete object?" The user may press the "enter" key again to delete the object. The object is then deleted from the memory associated with the user interface device 600 by deleting the identifier of the associated tag and the descriptive information. The process is repeated to delete additional objects at block 785, or terminated at block 750.

The edit feature advantageously allows the user to add, delete and modify information as needed. For example, if an electronic tag is moved from one object to another, the associated descriptive information can be updated. Moreover, if additional tags are purchased, or if tags are given away to friends or thrown away when no longer operating, the corresponding information can be added and deleted as needed.

Figure 8:
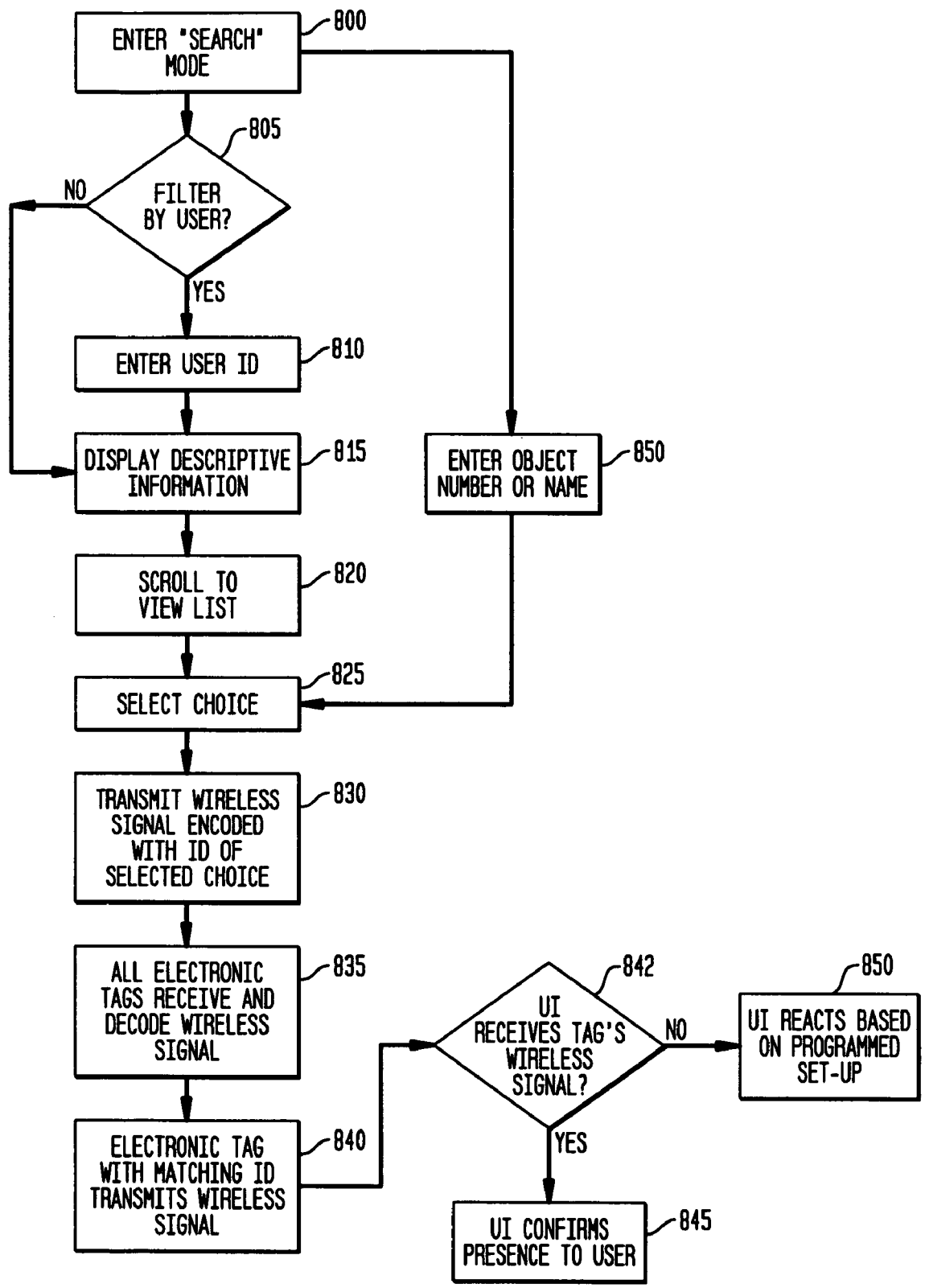
FIG. 8 illustrates an example method for locating or verifyng the presence of objects according to the invention.

FIG. 8 illustrates an example method for locating or verifying the presence of objects according to the invention. Objects that have been learned to the user interface device 600 can now be located or their presence verified. At block 800, the user selects the search mode on the user interface device 600, e.g., by entering an appropriate key sequence, such as "*2". The user may have previously entered a password or the like for accessing the user interface device 600. At block 805, the user decides if the list of objects that are displayed by the display 610 should be filtered by user. If so, the user enters the user identifier at block 810. The descriptive information for the objects, such as object name and number, are displayed at block 815. An example is provided in display 610 for the objects: child, senior and pet. The user may scroll up or down in the display 610 to view additional objects (block 820). The display 610 may indicate the total number of objects. At block 825, the user selects an object, such as by moving the arrow keys until the cursor is next to the desired object, and pressing the "select" key. Or, at block 850, the user can enter the object's sequence number directly, instead of scrolling among the different entries. For example, the display 610 uses "1" for "child", "2" for "senior", and "3" for "pet". The user may also enter a letter such as "c" which causes the display 610 to display all objects that begin with "g", e.g., "child".

A template, stickers or the like may be used with the keypad 620 to provide information for the features disclosed herein. For example, specific keys may be "soft" keys that enable the user to locate or verify the presence of specific objects, e.g., key "1" locates "child," key "2" locates "senior", etc., when the user interface device 600 is in a "search" mode. Dedicated hard keys to "find child", "find senior" and so forth may also be used.

Once an object is selected, at block 830, the wireless signal is transmitted that is encoded with the identifier of the electronic tag that was associated with the object in the learn mode. Any type of encoding, modulation, and wireless transmission scheme may be used. At block 835, all of the electronic tags within range of the activation signal receive and decode the signal to recover the identifier. At block 840, the tag whose pre-stored identifier matches the decoded identifier returns a wireless signal to verify its presence, assuming the tag is within the range of the activation signal. At block 842, it is determined whether the user interface (UI) receives the tag's wireless signal. If the answer is yes (block 845), upon receiving the tag's wireless signal, the user interface (UI) confirms the tag's presence to the user via an appropriate output. If no return signal is received from the tag (block 850), the user interface may react based on a pre-programmed setup, e.g., by generating an alarm, chime or taking other action.

In a further aspect of the invention, a schedule can be set so that the presence of an electronic tag is automatically verified periodically or at other specified times to confirm the presence of an object such as a child, senior or pet in the home. This may be done to assure a parent that the child, senior or pet has not wandered from the home or surrounding area. With this approach, the control panel 114 causes a signal encoded with the identifier of one or more specified electronic tags to be transmitted at specified times, e.g. every fifteen minutes. The corresponding tag receives the signal and returns its own signal to confirm its presence. The schedule can be set automatically by the control, and activated by the user, or can be set by the user via the user interface 140. An appropriate menu may allow the user to select days and times for activating the schedule. The user can also turn the feature on or off as desired, or set it to turn on or off at specified times.

In another aspect of the invention, the user interface 600 can be used to configure the remote transmitter 510 or remote detector 550 of FIG. 5. For example, using an appropriate menu scheme or hardware settings such as DIP switch settings, the user interface 600 can receive a user setting for configuring a transmission range of the remote transmitter, or a detection range of the detector 550. The control in the user interface 600 is responsive to the user setting for controlling a transmitter, e.g., transceiver 112, associated with the user interface 600 to transmit a signal to the remote transmitter 510 or detector 550, e.g., via receiver 560, to configure the transmission or detection range thereof, respectively, according to the user setting.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A system with a presence and location verification feature, comprising:
    a user interface device for receiving a command from a user to verify the presence of an object;
    a plurality of detectors for detecting the presence and location of the object, each of the plurality of detectors being associated with a transmitter;
    an electronic tag associated with the object, the electronic tag comprising:
        a receiver for receiving location information from one of the transmitters associated with one of the plurality of detectors;
        a transmitter for transmitting a wireless signal encoded with an identifier of the electronic tag and the received location information indicating the location of the object;
    a transceiver configured to transmit a wireless signal encoded with the identifier of the electronic tag associated with the object and receive the wireless signal from the electronic tag associated with the object;
    a control in communication with the user interface device and the transceiver, the control responsive to the command for controlling the transceiver to transmit the wireless signal encoded with the identifier of the electronic tag associated with the object;
    wherein the electronic tag transmits the wireless signal to the transceiver in response to receiving the wireless signal from the transceiver; and
    wherein the control is responsive to the wireless signal received by the transceiver for informing the user, via the user interface device, that the presence and location of the object is verified.

2. The system of claim 1, wherein:
    the command designates a schedule for transmitting the wireless signal encoded with the identifier at different times.

3. The system of claim 1, wherein:
    the user interface device enables the user to select the object whose presence is to be verified from among a plurality of objects for which respective electronic tags are associated.

4. The system of claim 1, wherein:
    the control controls at least one component in a security system.

5. The system of claim 1, further comprising:
    a memory for storing the identifier for the electronic tag responsive to inputs provided by the user via the user interface device.

6. The system of claim 1, wherein:
    the object comprises one of an inanimate object and a living being.

7. The system of claim 1, wherein:
    wherein the control is responsive to a lack of receipt of the wireless signal by the receiver for informing the user, via the user interface device, that the presence of the object is not verified.

8. The system of claim 1, wherein:
    at least one of the transmitter and the receiver is configured by a hardware setting.

9. The system of claim 1, wherein:
    at least one of the transmitter and the receiver is configured by a user setting.

10. An electronic tag for use with a presence and location verification feature, comprising:
    a memory for storing an identifier;
    a receiver for receiving a wireless signal encoded with an identifier, and another wireless signal from one of a plurality of detectors, the another wireless signal comprising information indicating a location of the electronic tag;
    a control for comparing the stored identifier to the received identifier; and
    a transmitter responsive to the control for transmitting a wireless signal for verifying a presence and location of the electronic tag when the stored identifier matches the received identifier, the wireless signal for verifying a presence and location comprising the stored identifier and the information indicating the location of the electronic tag.

11. A detection apparatus, comprising:
    a detector at a specified location for detecting the presence of a living being within a specified range;
    a transmitter at the specified location; and
    a control responsive to the detector for controlling the transmitter to transmit a wireless signal with a specified energy based on the specified range, the wireless signal comprising information indicating the specified location;
    wherein the wireless signal from the transmitter, when received by an electronic tag within the specified range, causes the electronic tag to transmit a wireless signal with data to a security system, the data comprising an identifier of the electronic tag and the information indicating the specified location.

12. The detection apparatus of claim 11, wherein:
    the data transmitted by the electronic tag causes the security system to take a specified action.

13. The detection apparatus of claim 11, further comprising:
    a memory that is pre-programmed with data for setting the specified energy.

14. The detection apparatus of claim 11, further comprising:
    at least one of the transmitter and the detector is configured by a remote user setting.

15. The detection apparatus of claim 11, wherein:
    at least one of the transmitter and the detector is configured by a hardware setting.

16. An electronic tag, comprising:
    a memory for storing an identifier;
    a receiver for receiving a first wireless signal from a security system and a second wireless signal from one of a plurality of detectors;
    a transmitter for transmitting a third wireless signal; and
    a control responsive to receipt of the first wireless signal by the receiver for controlling the transmitter to transmit the third wireless signal to the security system;
    wherein the third wireless signal is encoded with the identifier and the location of the electronic tag and other data for use by the security system.

17. The electronic tag of claim 16, wherein:
the other data in the third wireless signal causes the security system to take a specified action.

18. The electronic tag of claim 16, wherein:
at least one of the transmitter and the receiver is configured by a remote user setting.

19. The electronic tag of claim 16, wherein:
the other data is configured by a hardware setting.

20. The electronic tag of claim 16, wherein:
the other data is configured by a remote user setting.

21. The electronic tag of claim 16, wherein:
at least one of the transmitter and the receiver is configured by a hardware setting.

22. A method for controlling a security system, comprising:
detecting the presence of a living being within a specified range of a detector at a specified location;
responsive to the detecting, controlling a transmitter at the specified location to transmit a wireless signal having a specified energy based on the specified range, the wireless signal comprising information indicating the specified location;
receiving the wireless signal at an electronic tag when the electronic tag is within the specified range; and
responsive to the receiving, transmitting a wireless signal, which includes data for use by the security system, from the electronic tag to the security system, the data comprising an identifier of the electronic tag and information indicating the specified location.

23. The method of claim 22, wherein:
the data is relayed from the received wireless signal.

24. The method of claim 22, wherein:
the data causes the security system to take a specified action.

25. The method of claim 22, wherein:
the data is configured by a remote user setting.

26. The method of claim 22, wherein:
the data is configured by a hardware setting.

27. The method of claim 22, wherein:
the transmitted wireless signal from the electronic tag includes an identifier associated with the electronic tag; and
the security system uses the identifier in determining how to process the data.

* * * * *